F. E. COMSTOCK.
ANTIFREEZING CIRCULATOR.
APPLICATION FILED DEC. 2, 1914. RENEWED MAY 28, 1919.
1,309,243.                                                                 Patented July 8, 1919.
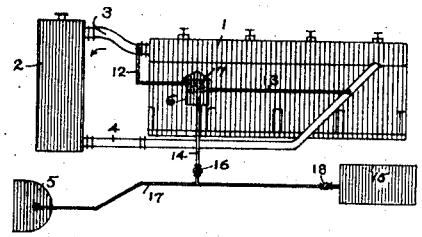
Fig. 1.
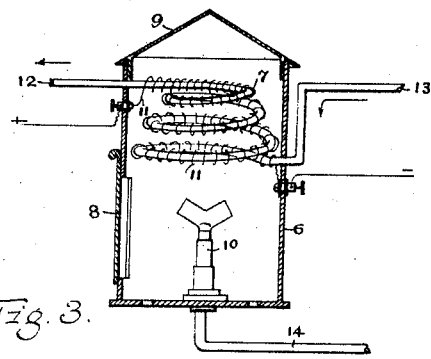
Fig. 3.
Fig. 2.
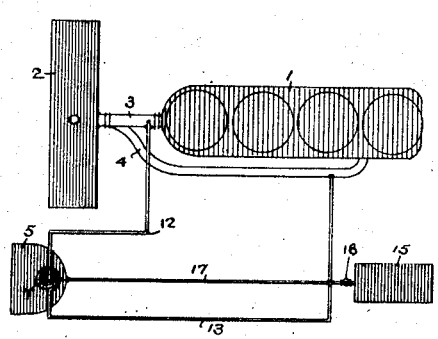
Fig. 4.
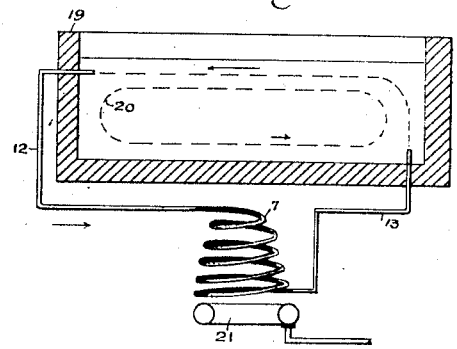
Fig. 5.
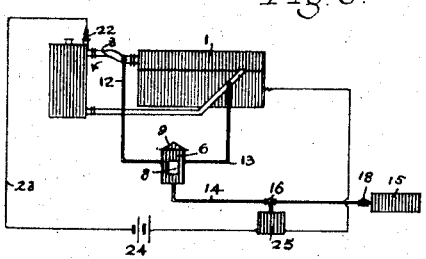
Fig. 6.
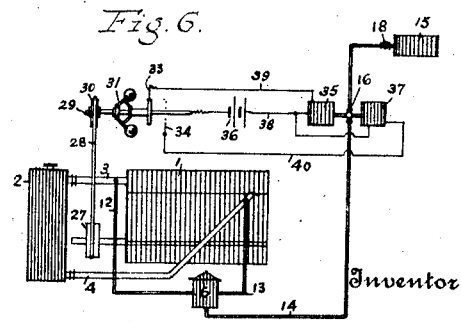
Witnesses
A. L. Austutz
W. J. Henry
Inventor
Frederick E. Comstock
By N. J. Austutz
Attorney

UNITED STATES PATENT OFFICE.

FREDERICK E. COMSTOCK, OF VALPARAISO, INDIANA, ASSIGNOR OF ONE-HALF TO ROY S. WHEELER, OF VALPARAISO, INDIANA.

ANTIFREEZING-CIRCULATOR.

1,309,243. Specification of Letters Patent. Patented July 8, 1919.

Application filed December 2, 1914, Serial No. 875,198. Renewed May 28, 1919. Serial No. 300,403.

*To all whom it may concern:*

Be it known that I, FREDERICK E. COMSTOCK, a citizen of the United States, residing at Valparaiso, in the county of Porter and State of Indiana, have invented certain new and useful Improvements in Antifreezing-Circulators, of which the following is a specification.

My invention relates to improvements in anti-freezing circulator and it especially comprises the features pointed out in the annexed claims.

The purpose of my invention is to provide an anti-freezing device applicable to automobiles, stock tanks, house tanks, etc.; that shall be useful wherever any container of water is to be kept from freezing; that will set up a secondary circulation and impart an increase in temperature as well as to keep the water moving; that shall be operable from an automobile head light, or from a separate heating unit suitably supported adjacent the engine; that may be automatically controlled electrically; that may be controlled mechanically; and that may be operated by acetylene gas, oil, gasolene or electric current and that further may have an alarm bell interconnected with the mechanical or other features which under failure to operate will signal the condition so as to avoid costly repairs, etc., due to the freezing of radiators, engine water jacket, general tanks, etc.

With these and similar ends in view I illustrate in the accompanying drawing such an instance of adaptation as will disclose the broad features without limiting myself to the specific details shown.

Figure 1 instances a diagrammatic relation of parts if applied to an automobile engine when the circulator is independent of the head light.

Fig. 2 is a diagrammatic plan view of Fig. 1 instancing the use of an automobile head light.

Fig. 3 is an enlarged elevation partly in section of a circular unit operated electrically or by means of a gas supply.

Fig. 4 instances diagrammatically, an adaptation to a stock tank.

Fig. 5 is a diagrammatic arrangement of parts when the operation of a circulator is automatically electrically controlled.

Fig. 6 is a view similar to Fig. 5 disclosing an instance wherein the unit circulator is automatically controlled in a mechanical manner.

Any desired automobile or other water cooled engine 1, is connected to a suitable radiator 2 by outgo 3 and by intake 4 whereby a circulation of the radiator fluid is maintained so long as the engine is in operation. As soon as the engine is at rest this circulation stops and unless special means are employed in cold weather the contents will freeze causing serious damage and inconvenience. It is of course understood that the pipes 3 and 4 connect with the ordinary water jacket found on almost all engines of this type.

If the contents of radiator 2, engine jacket and connections 3 and 4 is kept in motion there will be little likelihood of freezing. This can be done with little mechanism as will be seen from the instances shown in the drawing, wherein a circulator casing 6 incloses a suitable coil 7 one end 12 of which leads to radiator intake 3 and the other end 13 to engine jacket 4. This casing may have a removable hood 9, and door 8 and suitable air admission openings in its base. A gas burner 10 is secured therein being supplied by pipe 14 controlled by valve 16 from the main gas pipe 17 which also supplies head light 5 from tank 15 through valve 18. In case an electric source of heat is desired a suitable resistance coil 11 may be placed around 7 insulated therefrom and attached to any source of current, it being understood that any automatic control applied to a gas system may equally well be utilized in an electric installation.

Whenever the beneficial effects of automatic circulation are desired in general tanks, as 19, coil 7 may be connected by pipe 13 to the bottom and pipe 12 from near the top. This sets up a local circulation in the body of water including the pipes and coil 7. The heated water coming from coil 7 expands and a portion unable to reënter pipe 12 moves through the general body of water producing a secondary circulation 20 analogous to that maintained in radiator 2, connections 3, 4 and the engine jacket. In such an instance a gasolene burner 21 supplies the necessary heat. This may be adapted to utilize gas, petroleum or electric current if desired.

Should the instanced adaptation shown in Fig. 2 be used coil 7 may be located in the head light 5 and connected as in Fig. 1 by pipes 12 and 13 to the radiator system. Gas pipe 17 connects supply tank 15 to the head light.

In case an automatic electrical control is desired the same may be adapted somewhat as shown in Fig. 5 wherein a thermostat 22 is inserted in radiator 2 or connection 3, being connected to battery 24, magnetic control 25 and "ground" 26 by 23. As the temperature of 2 lowers through a stoppage of the engine 22 automatically controls valve 16 by means of 25 to both open the gas supply and simultaneously in a well known manner ignite the gas at burner 10.

Instead of the exclusive electrical control instanced in Fig. 5 a mechanical-electrical substitute may be employed wherein a pulley 27 attached to the engine shaft drives auxiliary shaft 29 through belt 28 and sheave 30. Governor 31 attached to shaft 29 rotates therewith carrying slidable disk 32 with it. As the engine speeds to a predetermined point disk 32 engages shut-off contact 33 thus actuating magnet 35 to close valve 16 and shut off the fuel supply. This is done through circuit 39, 38 and battery 36. When the engine is stopped governor 31 collapses moving disk 32 into contact with 34, circuit 40, magnet 37, return 38 and battery 36 to open valve 16 and simultaneously ignite the gas of burner 10. Any suitable means may be employed to avoid short circuiting battery 36 by prolonged use while the engine is at rest, as for instance by making disk 32 traverse past contact 34 so as to only engage it in passing.

It will be apparent that the ends sought may be accomplished very simply without the use of many moving parts in an economical manner. The auxiliary circulator is connected in parallel to the main system using but a very small part of the entire cooling solution. If a greater heating effect is desired the pipe system may be enlarged. When greater velocity is needed the pipe system would be smaller.

If desired an electric bell may be connected to the system so that if the valve controls 25, or 37 fail to supply fuel to burner 10 or ignite the same an alarm will be given thereby preventing dependence being placed in means that may be temporarily inoperative.

What I claim is,

1. An internal combustion engine, a water cooling jacket therefor, a radiator connected to the jacket so that the heat of the engine causes circulation within the jacket and radiator, an auxiliary device connected to the jacket and isolated from the radiator adapted to maintain independent circulation of the contents of the radiator and jacket, means for heating such device, and a combined automatic mechanical-electrical control for said heater adapted to start the same when the engine stops and stop the same when the engine is started.

2. An engine, a circulating system in connection therewith, a centrifugal governor driven by the engine, an auxiliary circulator connected with said system, and an electric control therefor whereby the auxiliary circulator is automatically set into action on the stoppage of the engine and automatically thrown out of service when the engine is restarted through the governor setting the electric control into action.

3. An engine, a circulating cooling system including a radiator connected therewith, means actuated by the engine responsive to changes in speed, an auxiliary circulator connected to the engine independently of the radiator, and an automatic control for said auxiliary circulator whereby the same is set into action on the stoppage of the engine and thrown out of service when the engine is restarted through the speed responsive means setting the automatic control into action.

4. An engine, a circulating system connected therewith, a controlling device actuated by the engine, and an auxiliary circulator connected to the engine and subject to said device whereby the said auxiliary circulator is automatically set into action on the stoppage of the engine and also automatically thrown out of service when the engine is restarted through the re-action of the controlling device.

In testimony whereof I affix my signature in presence of two witnesses.

FREDERICK E. COMSTOCK.

Witnesses:
 Roy S. Wheeler,
 W. J. Henry.